US006336467B1

(12) United States Patent
Schneider

(10) Patent No.: US 6,336,467 B1
(45) Date of Patent: Jan. 8, 2002

(54) FLOAT AND VALVE ASSEMBLY FOR ACCUMULATOR

(75) Inventor: Jeffry A. Schneider, Katy, TX (US)

(73) Assignee: Accumulators, Inc., Houston, TX (US)

( * ) Notice: Subject to any disclaimer, the term of this patent is extended or adjusted under 35 U.S.C. 154(b) by 0 days.

(21) Appl. No.: 09/518,951

(22) Filed: Mar. 6, 2000

(51) Int. Cl.$^{7}$ .................................... F16L 55/04

(52) U.S. Cl. .................... 137/192; 137/202; 137/207; 137/423; 137/433; 73/311; 73/448

(58) Field of Search .................... 73/309, 311, 322.5, 73/440, 448; 137/192, 202, 207, 423, 430, 433; 22/68; 251/355

(56) References Cited

U.S. PATENT DOCUMENTS 3,319,658 A * 5/1967 Mercier .................... 138/30
3,966,437 A * 6/1976 DeWolf et al. ............ 137/412
4,082,224 A * 4/1978 Mangus .................... 137/542
4,278,105 A * 7/1981 Koomey .................... 137/207
4,413,652 A * 11/1983 Allewitz .................... 138/31
4,526,205 A * 7/1985 Sugimura et al. ............ 138/30
5,038,831 A * 8/1991 Masson .................... 137/421
5,095,933 A * 3/1992 Olejak .................... 137/423
5,097,862 A 3/1992 Schneider
RE33,919 E * 5/1992 Kristoff et al. ........ 123/179.31
5,520,208 A 5/1996 Schneider
5,992,461 A * 8/1998 Gilmore et al. ........ 137/625.65
5,824,885 A * 10/1998 Lekholm .................... 73/440

* cited by examiner

*Primary Examiner*—Michael Powell Buiz
*Assistant Examiner*—Ramesh Krishnamurthy
(74) *Attorney, Agent, or Firm*—Fulbright & Jaworski

(57) ABSTRACT

An improved float and valve assembly for a liquid-gas accumulator including a buoyant float having a density selected in accordance with the working pressure, a float which can be lengthened or shortened, and friction and drag is reduced by optimizing the bore to rod length, honing coacting parts, providing a crown engaging the spring, and providing grooves in the exterior of the valve stem.

11 Claims, 2 Drawing Sheets

FLOAT AND VALVE ASSEMBLY FOR ACCUMULATOR

FIELD OF THE INVENTION

The present invention is directed to various improvements in a float and valve assembly for a liquid-gas accumulator. The improvements include a buoyant float which is connected to the valve in which the float has a density selected in accordance with the working pressure, and in which the float can be lengthened or shortened in responses to the type of liquid used and the altitude of use. In order to reduce friction and drag as the valve is longitudinally actuated, the ratio of bore length to valve rod length has been optimized, a crown is provided to reduce spring variance from the perpendicular, the valve stem and bore is honed to reduce drag, and grooves are provided in the periphery of the valve stem to reduce friction.

BACKGROUND OF THE INVENTION

It is known as described in U.S. Pat. Nos. 5,097,862 and 5,520,208 to provide a liquid-gas accumulator having a buoyant float connected to the inlet-outlet valve for avoiding the problems encountered by various guided float-type accumulators, which have been used in the past, which are subject to the possibility of cocking or sticking and malfunctioning.

Liquid-gas accumulators have had various applications, such as in the oil and gas drilling industry, and typically have a working pressure of 3000 psi and are limited to an underwater working depth of 7000 feet. However, there is now a need for accumulators having a greater working pressure of 6000 to even 10,000 psi and an underwater working depth of 17,000 feet. The prior art float structures did not foresee the problems involved in using different pressures. It would generally assume that the prior art designs would work at any pressure. However, field use shows that at pressures above 3000 psi, the float material of the prior art could crush or absorb working fluid. An improved float was needed at higher pressures.

In addition, prior art float-type accumulators were designed with the assumption that water was used as the working fluid at sea level. Water has a specific gravity of 1.00 at sea level. The prior art accumulators work because of the differential between the specific gravity of the water and the lower specific gravity of the float material. The differential is commonly known as buoyancy. However, field use demands a multitude of fluid compatibilities and of altitudes. Alternate fluids have a different specific of gravity, so consequently the buoyancy changes, and the float and valve assembly is no longer balanced. Altitude also affects the buoyancy in a similar fashion. The total buoyancy of the float is its specific gravity times its mass in ratio to the accumulator fluid's specific gravity at the altitude selected. Therefore, the mass of the float must be adjusted to solve these problems.

Yet another problem in the prior art float mechanisms is the issue of friction and drag. In order to work effectively, the float and valve assembly must travel up and down vertically. While the float and valve assembly of the present invention avoids the use of guided cages which have inherent friction and drag, variance from perpendicular of the present float and valve assembly reduces the efficiency of the operation. The float valve assembly tends to be top heavy and any wobble between the valve stem and its supporting bore causes drag and friction, therefore, a need for maintaining vertical alignment of the valve and float assembly is desired.

Yet another problem is that the opening biasing spring in the prior art accumulator acts against the bottom of a poppet valve causing the valve to lean to one side and thus adding to the variance from perpendicular. Therefore, in order to hold the spring in the vertical position, there is a need to direct the force of the spring upwardly.

Another field problem noted is that the float and valve assembly must travel up and down smoothly and any drag or friction between the valve stem and its supporting bore adds to the inaccuracy of operation.

Various improvements are provided for aligning the valve in a vertical direction for longitudinal movement by better and smoother contact support between the valve stem and supporting bore. However, fluid which is trapped between the valve stem and bore creates a negative force impeding the smooth operation and a need is desired to reduce fluid drag.

SUMMARY OF THE INVENTION

One feature of the present invention is the provision of a float and valve assembly for a liquid gas accumulator in which the density of the float is selected so that it can be matched to the anticipated working pressure. In one preferred embodiment the density of the float is selected to be greater than 44 pounds per cubic feet to thereby accommodate higher pressures.

Another improvement of the present invention is wherein the mass of the float is adjusted in order to allow the accumulator to properly work with a higher or lower specific gravity fluid or at a higher or lower altitude. In the preferred embodiment a float having a plurality of segments can be used to be lengthened or shortened to meet the operating conditions for different fluids and different altitudes.

Another improvement of the float and valve assembly is to lengthen the supporting bore around the stem of the valve to reduce wobble and insure that the float and valve have less variance from the perpendicular. In the preferred embodiment the preferable length of the bore relative to the length of the float and valve assembly is 1:5.05.

Another improvement to the present invention is a provision of a crown on the underside of the poppet valve to engage and hold the spring in a vertical position to prevent the spring from pushing the valve out of its vertical alignment.

Still a further improvement to the present invention is the provision of honed surface finishes on the coacting surfaces of the bore support and the poppet valve stem for reducing drag.

And still a further improvement is the provision of one or more grooves cut on the outer periphery of the valve stem to channel fluid therein to reduce the drag of the valve stem in its supporting bore. In the preferred embodiment the grooves are longitudinally and axially positioned on the stem.

Still a further object of the present invention is the provision of a float and valve assembly for a liquid-gas accumulator having a housing with a top gas port and a bottom liquid port, a gas charging valve positioned in the top port for admission of high pressure gas, and a sleeve releasably connected in the liquid port and including a valve seat. The float and valve assembly includes a vertically extending bore in the sleeve, a poppet valve element coacting with the seat for opening and closing the port and including a stem longitudinally movable in the bore, spring means positioned between the sleeve and the bottom of the poppet valve element yieldably urging the valve to the open position, and a buoyant float rigidly connected only to the poppet valve element for controlling the opening and closing of the valve in response to the level of liquid in the housing. The float has a density selected to be sufficient to avoid failure at the desired working pressure. In a further embodiment, the density of the float is greater than 44 pounds per cubic feet.

Still a further object is wherein the float includes a plurality of segments whereby the buoyancy of the float may be changed to meet operating requirements.

Still a further object is wherein a crown is provided on the bottom of the poppet valve coacting with the top of the spring to maintain the spring in the vertical position.

Yet a still further object is wherein the stem includes an outside coacting with an inside of the bore and wherein the outside and inside are honed to a finish for reducing friction and drag. In the preferred embodiment the finish is a maximum of 16 on a mirror finish gauge.

Yet a still further object of the present invention is wherein the ratio of the length of the bore relative to the length of the float and valve assembly is 1:5.05.

Still a further object is wherein the stem includes an outside having one or more grooves cut in the outside for reducing drag between the stem and the bore. In one embodiment the grooves are axially extending.

Other and further objects, features and advantages will be apparent from the following description of a presently preferred embodiment of the invention, given for the purpose of disclosure, and taken in conjunction with the accompanying drawings.

DETAILED DESCRIPTION OF THE PREFERRED EMBODIMENT

Figure 1:
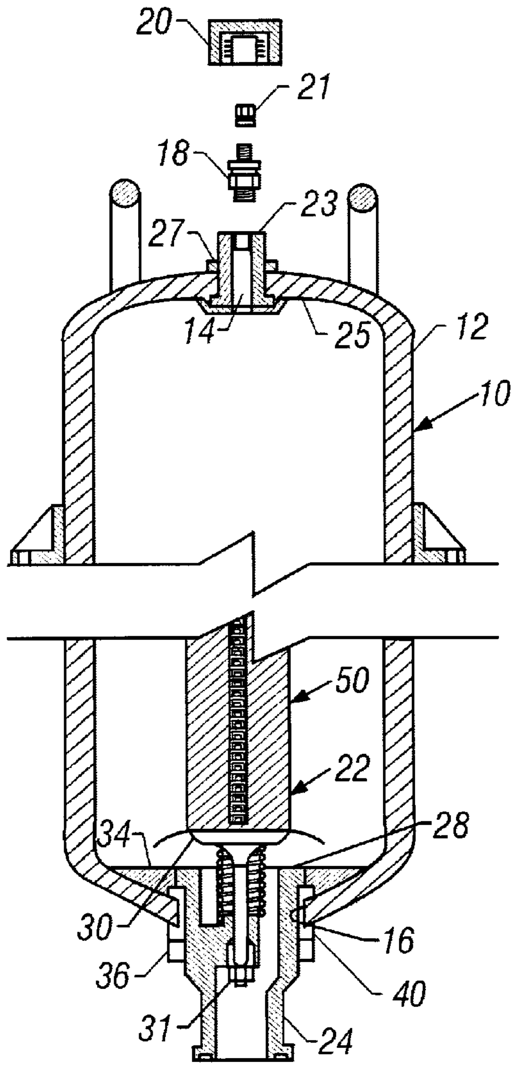
FIG. 1 is a fragmentary elevational view, in cross section, of the present invention showing the accumulator in an open position.

Referring now to the drawings, the reference numeral 10 generally indicates the liquid-gas accumulator of the present invention having a housing 12 which may be of any suitable configuration, such as cylindrical or spherical, and here shown as being cylindrical.

The housing 12 includes a top gas port 14 and a bottom liquid port 16. The top port 14 is adapted to receive a conventional high pressure gas charging valve 18 which may include a protective valve cap 20, safety cap 21, stem 23, seal 25 and nut 27.

Figure 2:
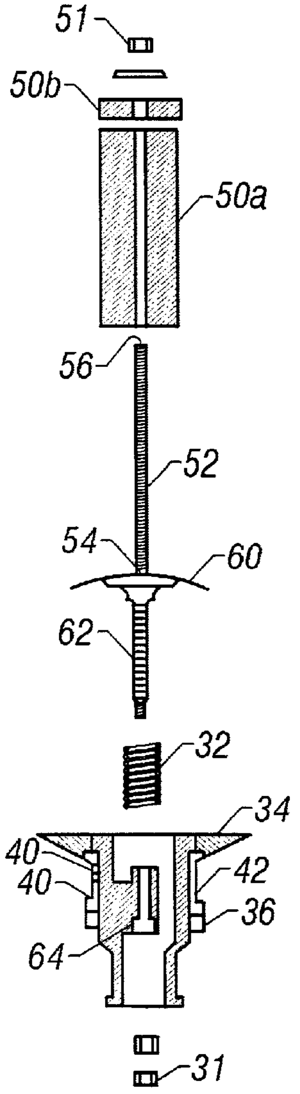
FIG. 2 is an enlarged exploded perspective view of the valve and float assembly.
Figure 3:
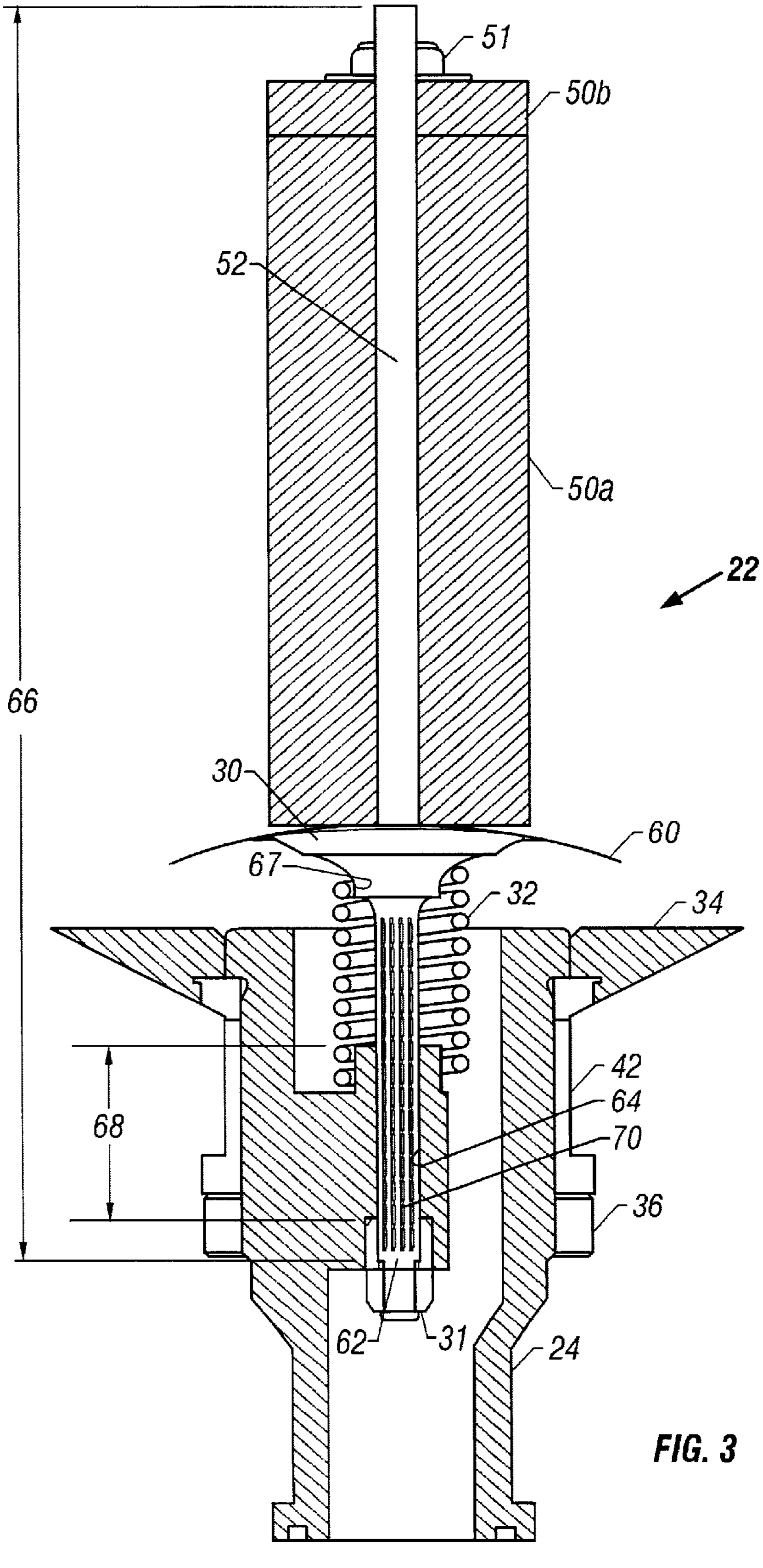
FIG. 3 is an enlarged elevational view, in cross section, of the valve and float assembly and its connection to the sleeve.

A valve and float assembly generally indicated by the reference numeral 22 (FIGS. 1, 2 and 3) is provided positioned in the liquid port 16. The assembly 22 includes a sleeve 24 having a first end which includes a valve seat 28. A valve element such as a poppet valve 30 attached to a nut 31 coacts with the seat 28 for opening and closing the port 16. Spring 32 yieldably urges the valve element 30 to a normally open position. Various other components are provided for securing and sealing the sleeve 24 in the port 16 including an anti-extrusion ring 34, a locknut 36 and seals 40 and 42.

Generally, the accumulator 10 includes a supply of fluid such as a variety of hydraulic fluids, a water and glycol mixture, filtered sea water, and a precharged gas, usually nitrogen, for providing high pressure fluid at the outlet towards 16 upon actuation of a downstream valve (not shown).

A buoyant float 50 is provided which is rigidly connected to the poppet valve 30 by any suitable means such as a rod 52 having a first end 54 threadably connected to the top of the poppet 30 and a second end 56 extending into and threadably enclosing the float 50 by a nut 51. The float 50 is preferably a solid material, such as a syntactic foam buoyancy material such as one sold under the trademark "ECCOOFLOAT" is satisfactory. The float 50 may be of any suitable shape, but is preferably a cylinder having a diameter no greater than the outside diameter of the port 16 so that the float 50 may be installed into and removed from the port 16 with the sleeve 24.

The float 50 does not "float" in the liquid in the housing 12 in the sense that it travels with the liquid level of the liquid. However, the float 50 is buoyant and its buoyancy assists in opening the poppet valve 30 from the valve seat 28. Thereafter, the float 50, because it is rigidly connected to the poppet 30 becomes submerged as the liquid rises in the housing 12. When the liquid is released through the port 16, the weight of the float 50, as it loses its buoyancy, overcomes the spring 32 at which time the poppet 30 will seat on the valve seat 28 and prevent the escape of the gas pressure by the weight of the float 50. In addition, a secondary seal 60 may be provided which is positioned on the top of the poppet 30 and between the poppet valve 30 and the buoyant float 50. The resilient seal maybe made out of any suitable material, such as rubber or "VITON" and extends outwardly beyond the periphery of the poppet valve 30 so as to engage and seat on the end of the sleeve 34 outside of the valve seat 28.

The above general description of the accumulator is generally disclosed in my prior U.S. Pat. Nos. 5,520,208 and 5,097,862.

However, the prior art and these patents did not foresee the need to accommodate different pressures in the accumulator 10. It was assumed that the design would work at any pressure. However, field use showed that at pressures above 3000 psi the conventional float 50 could crush or absorb working fluid. A "stronger material" was needed at higher pressures which in today's conditions may reach 10,000 psi. However, changing the strength of the material required denser material that is less buoyant, particularly at lower pressure. Therefore, the prior art material was not satisfactory at higher pressures, but a high density material is not satisfactory at lower pressures. Therefore, a range of materials, with specific characteristics, has been selected that can be matched to the anticipated working pressure. Therefore, the present invention, as one feature, is directed to providing float inserts that can be changed to meet the anticipated working pressure. The material is syntactic foam which is a blend of microballoons and epoxy resin, still sold under the trademark "ECCOFLOAT: in which the density is selected to specify the maximum buoyancy at the maximum pressure rating. For example, with an accumulator having a maximum pressure rating of 0–2000 psi, the density would be less than 43 pounds per cubic feet, with the maximum pressure rating in the range 2001–5000 the density would be 44 pounds per cubic foot and for maximum pressure rating of 5001–8000 psi the density would be greater than 45 pounds per cubic foot.

The prior art and the above-described patents assumed water as the working fluid at sea level. Water has a specific gravity of 1.00 at sea level. The prior art accumulator works because of the differential between the specific gravity (SG) of the water and the lower specific gravity of the float material 50. The differential is commonly known as buoyancy. However, field use of the accumulator 10 requires a multitude of fluid compatibilities at a multitude of altitudes. Alternate fluids have a different SG so consequently the buoyancy changes, and the valve float assembly 22 is no longer balanced. Altitude also affects the buoyancy in a similar fashion. The total buoyancy of the float is its SG times its mass in ratio to the fluid's SG at the altitude selected. In order to work in a higher or lower SG fluid or at a higher or lower altitude, the mass times the SG must increase or decrease for the specific application. While the density of the material is dependent upon the maximum pressure rating as described above, the mass of the float 50 must be adjusted to balance the system. The mass in the float 50 can be adjusted by adjusting its length providing a variety of different single length floats 50 is not a practical solution. Preferably, the length of the float 50 can be changed in segments. Thus, the float of the present invention may be a segmented float having two or more segments 50*a* and 50*b* so that the float 50 can be lengthened or shortened by the user to meet field requirements or different operating fluids and different altitudes. For example only, in one embodiment of the present invention, at sea level, in which water having an SG of 1.00 is used as a fluid, the length of the float would be 10 inches. When gasoline, which has an SG of 0.88 is used as the operating fluid, the length of the float 50 would be 10.5 inches. And if hydraulic oil, which has a specific gravity of 0.80, is used as the operating fluid the length of the float 50 would be 11 inches.

The buoyant float 50 which is rigidly connected to the poppet valve 30 eliminates the need for stabilizing guides or walls around the float 50 and thus avoids the possibility of cocking or sticking of the float against such guides. However, in the present invention the poppet 30 includes a stem 62 which is longitudinally movable in a bore 64 which extends vertically in the sleeve 24. In order to work effectively, the valve stem 62 must travel up and down vertically along the axis of the float and valve assembly 22. Variance from perpendicular reduces the efficiency of the operation. In the prior art patents, the float 50 tended to be top heavy creating a wobble which created additional friction and drag in the operation of the float and valve assembly 22. Another feature of the present invention is that the bore 64 has been lengthened to establish a specific ratio between the overall length 68 of the bore 64 and the overall float and valve assembly length 66. This specific ratio of the present invention is 1:5.05. The old designs used a design ratio of 1:10.93. Therefore, the new design is a significant departure from the prior art.

Another problem found in the prior art accumulators is that the prior art used poppet valves which were found in typical internal combustion engines which had curved surfaces on the lower side of the poppet valve engaging the spring 32. The springs typically tended to more forcefully engage one side of the bottom of the poppet valve 30 thus adding to the variance from the perpendicular creating additional friction and drag of the float and valve assembly 22. Another improvement of the present invention is the provision of a crown 67 (FIG. 3) which is positioned on the bottom of the poppet valve 30 coacting with the top of the spring 32 by engaging the inside of the top of the spring 32 to maintain the spring 32 in the vertical position. This improvement assists in reducing the leaning force of the spring 32 against the poppet 30.

Increasing the density and length of the float 50 will increase the weight of the float and valve assembly 22. It was found in testing a prototype that the accumulator 10 was closing prematurely. Because of the increased weight of the assembly 22, the tension of the spring 32 was required to be increased to properly close the accumulator 10.

The float and valve assembly 22 must travel up and down smoothly. Any drag or friction makes the operation of the accumulator 30 less efficient. Such smooth travel is important for the closing of the accumulator 10. With the added length of the bore 68 as described above, there is added surface area between the interior of the bore 64 and the exterior of the poppet stem 62 increasing the amount of friction. Friction and drag has been reduced by the honing of the exterior of the poppet rod stem 62 and the interior of the bore 64 to a maximum "16" finish as measured on a microfinished gauge as compared with the finish on a standard poppet valve of 63–32 finish. The present honing finish reduces drag and fiction.

As described above, the importance of the smooth up and down travel of the float and valve assembly 22 and the reduction of friction and drag is important. As the close tolerances between the stem 62 and bore 64 is maintained to prevent variance from the vertical travel, the friction therebetween becomes more important. In addition, because of the close tolerance between the stem 62 and bore 64, fluid is trapped therebetween and consequently this fluid builds up pressure that creates a negative force to impede the vertical movement of the stem 62 in the bore 64. Another feature of the present invention is the provision of grooves 70 cut in either the exterior of the stem 62 or the interior of the bore 64 for reducing fluid flow. And reducing contact friction. While the grooves may be of various types, preferably longitudinally grooves in the exterior of the poppet stem 62 channels the fluid out of the area between the stem 62 and bore 64 thereby reducing drag and fiction. While the grooves could be spiral, horizontally extending grooves would be less than satisfactory. For example only, in one embodiment, eight grooves having a depth of 0.020 inches with a diameter of 0.032 inches has been found to be satisfactory.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts, will readily suggest themselves to those skilled in the art and which are encompassed within the spirit of the invention and the scope of the appended claims.

What is claimed is:

1. A float and valve assembly for a liquid-gas accumulator having a housing with a top gas port and a bottom liquid port, a gas charging valve positioned in the top port for admission of high pressure gas, a sleeve releasably connected in the liquid port and including a valve seat, said float and valve assembly comprising said sleeve including a vertically extending bore, a poppet valve element coacting with the seat for opening and closing the liquid port and including a stem longitudinally movable in a vertical support in the bore, spring means positioned between the sleeve and the bottom of the poppet valve element yieldably urging the valve to the open position, and a buoyant float rigidly connected only to the poppet valve element for controlling the opening and closing of the valve in response to the level of liquid in the housing, said accumulator having a working pressure above 3000 psi and said float having a density greater than 44 pounds per cubic feet selected to be sufficient to avoid failure at the working pressure.

2. The assembly of claim 1 wherein the float includes a plurality of equal density segments whereby the buoyancy of the float may be changed to meet operating requirements.

3. The assembly of claim 1 including a vertically extending crown on the bottom of the poppet valve element coacting with the inside of the top of the spring means to maintain the spring means in the vertical position.

4. The assembly of claim 1 wherein the stem includes an outside coacting with an inside of the bore and the coacting outside and inside are honed to a finish for reducing friction and drag.

5. The assembly of claim 4 wherein the finish is a maximum of 16 on a microfinish gauge.

6. The assembly of claim 1 wherein the ratio of the length of the vertical support in the bore relative to the length of the float and valve assembly is substantially 1:5.05.

7. The assembly of claim 1 wherein the stem coaxially extends in the sleeve and includes an outside having one or more grooves cut in the outside for reducing drag between the stem and the support in the bore.

8. The assembly of claim 8 wherein the grooves are axially extending.

9. A float and valve assembly for a liquid-gas accumulator having a housing with a top gas port and a bottom liquid port, a gas charging valve positioned in the top port for the admission of high pressured gas; a valve assembly positioned in the liquid port, said valve assembly including a sleeve having a first end which includes a valve seat, a valve element guided in the sleeve and coacting with the seat for opening and closing the liquid port; spring means yieldably urging the valve element to an open position, and a buoyant float rigidly and releasably connected to the top of the valve assembly for controlling the opening and closing of the valve element in response to the level of liquid in the housing comprising, said float including a plurality of equal density segments which may be added or subtracted from the float to meet operating requirements.

10. A float and valve assembly for a liquid-gas accumulator having a top gas port and a bottom liquid port, a gas charging valve positioned in the top port for admission of high pressure gas, a valve assembly positioned in the liquid port, said valve assembly including a sleeve having a first end which includes a valve seat, a valve element guided in the sleeve and coacting with the seat for opening and closing the liquid port, spring means yieldably urging the valve element to an open position and a buoyant float rigidly connected to the top of the valve assembly for controlling the opening and close of the valve element in response to the level of liquid in the housing wherein, said sleeve includes a coaxial vertically extending bore, and the valve includes a stem longitudinally movable in a vertical support in the bore, and the stem includes an outside having one or more grooves cut in the outside for reducing drag between the stem and the support in the bore.

11. The assembly of claim 10 wherein the ratio of the length of the vertical support in the bore relative to the length of the float and valve assembly is substantially 1:5.05.

* * * * *